(12) United States Patent
Tanaka et al.

(10) Patent No.: US 8,672,590 B2
(45) Date of Patent: Mar. 18, 2014

(54) CUTTING INSERT

(75) Inventors: Kunishige Tanaka, Itami (JP); Shinya Uesaka, Itami (JP)

(73) Assignee: Sumitomo Electric Hardmetal Corp., Itami-Shi, Hyogo (JP)

( * ) Notice: Subject to any disclaimer, the term of this patent is extended or adjusted under 35 U.S.C. 154(b) by 69 days.

(21) Appl. No.: 13/387,957

(22) PCT Filed: Mar. 4, 2011

(86) PCT No.: PCT/JP2011/055069
§ 371 (c)(1),
(2), (4) Date: Jan. 30, 2012

(87) PCT Pub. No.: WO2011/122242
PCT Pub. Date: Oct. 6, 2011

(65) Prior Publication Data
US 2012/0128438 A1 May 24, 2012

(30) Foreign Application Priority Data
Mar. 29, 2010 (JP) ................................ 2010-074968

(51) Int. Cl.
*B23B 27/16* (2006.01)
(52) U.S. Cl.
USPC .......................................... 407/113; 407/115
(58) Field of Classification Search
USPC .................. 407/113, 114, 115, 116
See application file for complete search history.

(56) References Cited

U.S. PATENT DOCUMENTS

| | | | | |
|---|---|---|---|---|
| 4,359,300 A | * | 11/1982 | Hazra et al. | 407/114 |
| 5,006,020 A | * | 4/1991 | Roos | 407/113 |
| 5,056,963 A | * | 10/1991 | Kameno et al. | 407/1 |
| 5,456,557 A | * | 10/1995 | Bernadic et al. | 407/114 |
| 5,584,616 A | * | 12/1996 | Katbi et al. | 407/114 |

FOREIGN PATENT DOCUMENTS

| | | | |
|---|---|---|---|
| EP | 418619 A1 | * | 3/1991 |
| EP | 1859882 A1 | * | 11/2007 |
| JP | 59-66511 U | | 5/1984 |
| JP | 8-155702 A | | 5/1996 |

(Continued)

OTHER PUBLICATIONS

Machine Translation of IDS reference JP 2007-190633.*

(Continued)

*Primary Examiner* — Daniel Howell
*Assistant Examiner* — Nicole N Ramos
(74) *Attorney, Agent, or Firm* — Ditthavong Mori & Steiner, P.C.

(57) ABSTRACT

A cutting insert including a substrate having a seat recessed from a top surface at a corner and a superhard sintered body bonded to the seat. The body includes a cutting edge, a rake face with positive rake angle, and chip breaker including, in plan view, a projection projecting from a line that crosses a bisector of the corner toward a tip end of an arc edge of the cutting edge. A first breaker wall is formed between a top edge of the projection and the rake face. A second breaker wall is formed between a ridge line extending from a base end of the projection to a side surface of the body and the rake face. Another ridge line formed between the rake face and the side surface is inclined whereby a distance to a bottom surface of the substrate decreases as a distance from the cutting edge increases.

10 Claims, 8 Drawing Sheets

(56) References Cited

FOREIGN PATENT DOCUMENTS

| JP | 2006095620 | A | * | 4/2006 |
|---|---|---|---|---|
| JP | 2006187813 | A | * | 7/2006 |
| JP | 2007-190633 | A | | 8/2007 |
| JP | 2007260848 | A | * | 10/2007 |
| JP | 2008200831 | A | * | 9/2008 |
| JP | 2008207312 | A | * | 9/2008 |
| WO | WO 2005-068117 | A | | 7/2005 |

OTHER PUBLICATIONS

International Search Report for PCT Application No. PCT/JP2011/055069 dated May 10, 2011, pp. 1-2.

* cited by examiner

CUTTING INSERT

TECHNICAL FIELD

The present invention relates to cutting inserts used as cutting edges of cutting tools, and more particularly, to a cutting insert with a chip breaker used to process, for example, hardened steel. Here, the "cutting insert" is a component including a substrate and a superhard sintered body containing a cubic boron nitride sintered body (hereinafter referred to simply as a "superhard sintered body"). The superhard sintered body is bonded to a corner of the substrate, and a cutting edge is formed in the superhard sintered body.

BACKGROUND ART

PTL 1 describes an example of the above-described cutting insert according to the related art. The cutting insert disclosed in PTL 1 includes a substrate having a seat at a corner thereof, the seat being recessed from the top surface of the substrate. A superhard sintered body is bonded to the seat, and a cutting edge, a rake face, and a chip breaker are formed in the superhard sintered body.

In the cutting insert according to PTL 1, a relatively large negative rake face is formed along edges of the top surface of the substrate and the superhard sintered body. A flat land, which functions as a rake face, is formed in the superhard sintered body by removing a corner of the superhard sintered body along a ridge line that function as a cutting edge at a position such that the negative rake face somewhat remains. A chip breaker is formed by cutting the superhard sintered body obliquely upward from an end of the land.

The chip breaker includes a projection that projects from the position of the negative rake face toward a tip end of an arc edge such that the amount of projection is at a maximum at the center thereof and a breaker wall that extends obliquely upward from the rake face toward a top edge of the projection. The breaker wall includes two surfaces that are connected to each other at an angle.

CITATION LIST

Patent Literature

PTL 1: International Patent Publication No. WO2005/068117

SUMMARY OF INVENTION

Technical Problem

A rake angle of the cutting insert according to PTL 1 is set to 0°. Accordingly, the cutting force is large and crater wear easily occurs. Therefore, there is a possibility that the life of the cutting insert can be extended by reducing the cutting force.

In addition, since the rake angle is set to 0°, it is difficult to form a sufficiently high breaker wall. Therefore, there is also a room for improvement in chip breaking performance.

When aluminum or the like is cut, load applied to an insert during a cutting process is small. Accordingly, in the related art, a diamond compact may be bonded to a corner of a substrate and a cutting edge, a rake face, and a chip breaker may be formed in the diamond compact such that the rake face has a positive rake angle.

However, a cutting insert having a cutting edge formed of a superhard sintered body is generally used to process a difficult-to-cut material, such as hardened steel, and is required to bear a large cutting load. Therefore, if the cutting insert is formed to have a simple shape with a positive rake angle, sufficient cutting-edge strength cannot be obtained and the cutting insert cannot be put to practical use. Therefore, commercial cutting inserts with cutting edges formed of superhard sintered bodies that have a positive rake angle cannot be found in the market.

An object of the present invention is to provide a cutting insert that can be designed to have a positive rake angle while ensuring the required cutting-edge strength, so that the cutting force can be reduced, the life can be extended, and the chip breaking performance can be improved.

Solution to Problem

To achieve the above-described object, according to the present invention, a cutting insert comprising a substrate having a seat recessed from a top surface of the substrate at a corner of the substrate and a superhard sintered body bonded to the seat, a cutting edge, a rake face, and a chip breaker being formed in the superhard sintered body, has the following structure.

That is, the chip breaker includes, in a plan view of the insert, a projection that projects from a line that crosses a bisector of the corner toward a tip end (T) of an arc edge of the cutting edge; a first breaker wall formed between a top edge of the projection and the rake face; and a second breaker wall formed between a ridge line that extends from a base end of the projection to a side surface of the superhard sintered body and the rake face.

In addition, the cutting edge formed in the superhard sintered body includes an arc edge that has a substantially constant height and in which a truncated portion is formed to reinforce the tip of the edge. Here, "substantially constant" does not mean that there is no variation in height at all, but means that the height does not largely vary in an area where the cutting edge is formed. For example, it is assumed that the height is substantially constant when the variation in height in the area where the arc edge is formed is within 0.5 mm. The truncated portion may either be a chamfered surface (C surface) or a round surface formed by honing.

The rake face has a positive rake angle, and a ridge line formed between the rake face and the side surface of the superhard sintered body is inclined such that a distance to a bottom surface of the substrate decreases as a distance from the cutting edge increases.

The cutting edge may further include linear edges that continue from both ends of the arc edge.

Preferred embodiments of the cutting insert will now be described.

(1) A standing angle $\theta 2$ of the first and second breaker walls may be greater than or equivalent to a rake angle $\theta 1$ of the rake face.

(2) A distance from the tip end of the arc edge to a projecting end of the projection and a depth of the cutting edge from a top surface of the superhard sintered body satisfy the following conditions: $0.1 \text{ mm} \leq W \leq 1.8 \text{ mm}$ and $0 \text{ mm} \leq t \leq 0.5 \text{ mm}$.

(3) The rake angle of the rake face is greater than 0° and is smaller than or equal to 30°.

(4) A negative rake face having a predetermined height is formed at a crossing section between a top surface and a side surface of the substrate, the top edge of the projection being located on an extension of a ridge line between the negative rake face and the top surface, the second breaker wall crossing the negative rake face.

Advantageous Effects of Invention

In the cutting insert according to the present invention, the rake face has a positive rake angle. In addition, the ridge line formed between the rake face and the side surface of the superhard sintered body is inclined such that a distance to a bottom surface of the substrate decreases as a distance from the cutting edge increases. Accordingly, the chips easily flow out and the cutting force is reduced.

In addition, since the rake angle is set to a positive value, the pressure with which the chips are pressed against the rake face is reduced. Accordingly, crater wear of the rake face is reduced.

In addition, the cutting edge formed in the superhard sintered body includes the arc edge that has a substantially constant height and in which the truncated portion is formed to reinforce the tip of the edge. Accordingly, although the strength of the tip of the edge is reduced because the rake angle is set to a positive value, the reduction in strength is compensated for and fracture resistance that is high enough to achieve processing of the difficult-to-cut material can be obtained.

In addition, since the rake angle is set to a positive value, the height of the breaker walls is increased and the chips more reliably come into contact with the breaker walls compared to the case in which the rake angle is set to 0°. Depending on the cutting conditions, there is a possibility that the chips will flow outward without being curled along the first breaker wall. However, in such a case, the second breaker wall, which is positioned ahead of the first breaker wall in the flow-out direction, effectively curls the chips. Thus, the chip breaking performance is improved.

The operation and effects of the above-described preferred embodiments will be described below.

BRIEF DESCRIPTION OF DRAWINGS

FIG. 8 is a diagram illustrating (a) chips formed by a cutting insert of comparative example 1 in Example 1; (b) chips formed by a cutting insert of comparative example 2 in Example 1; and (c) chips formed by the cutting insert of the present invention in Example 1.

FIG. 10 is a diagram illustrating (a) chips formed by a cutting insert of comparative example 1 in Example 2; (b) chips formed by a cutting insert of comparative example 2 in Example 2; and (c) chips formed by the cutting insert of the present invention in Example 2.

DESCRIPTION OF EMBODIMENTS

Cutting inserts according to embodiments of the present invention will now be described with reference to FIGS. 1 to 16.

Figure 1:
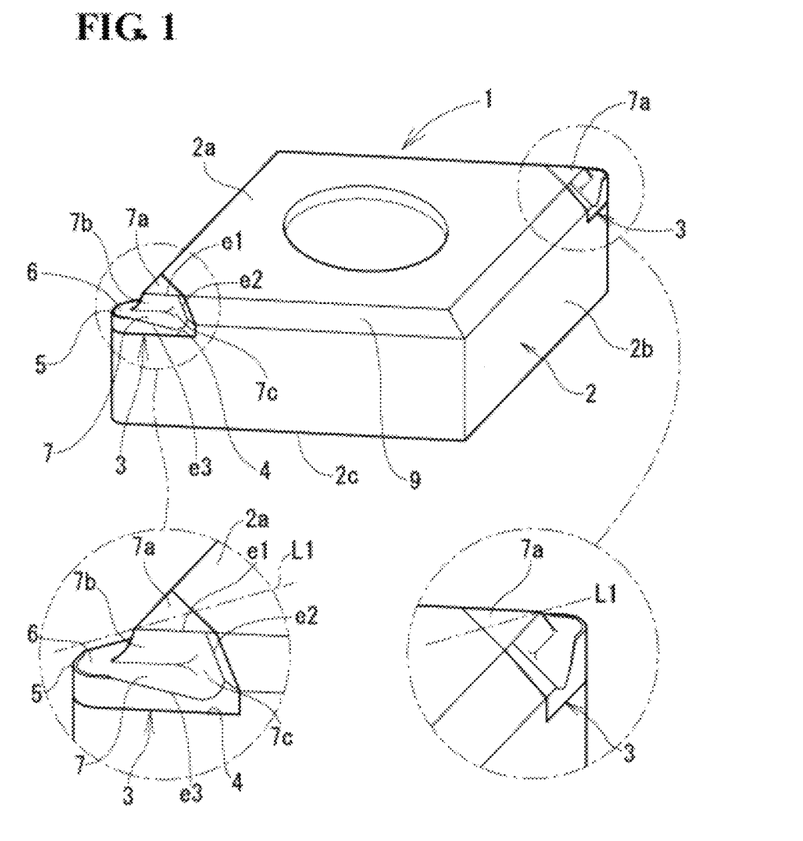
FIG. 1 is a perspective view illustrating an example of a cutting insert according to the present invention.

FIG. 1 illustrates a diamond-shaped cutting insert to which the present invention is applied. This cutting insert 1 includes a substrate 2 formed of cemented carbide and small superhard sintered bodies 3 bonded to the acute corners of the substrate 2. Each superhard sintered body 3 is a known sintered body in which the content of cubic boron nitride is 20 volume percent or more.

Seats 4 are formed in acute corners of the substrate 2 such that the seats 4 are recessed from the top surface of the substrate 2 by a predetermined amount, and the superhard sintered bodies 3 are brazed on the seats 4. A cutting edge 5, a rake face 6, and a chip breaker 7 are formed in each superhard sintered body 3, the rake face 6 being recessed from the top surface of the superhard sintered body 3.

Figure 2:
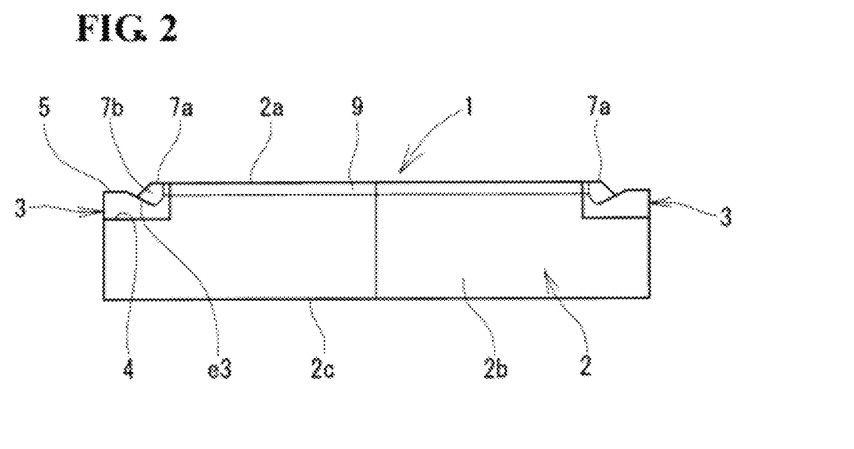
FIG. 2 is a side view of the cutting insert illustrated in FIG. 1.
Figure 3:
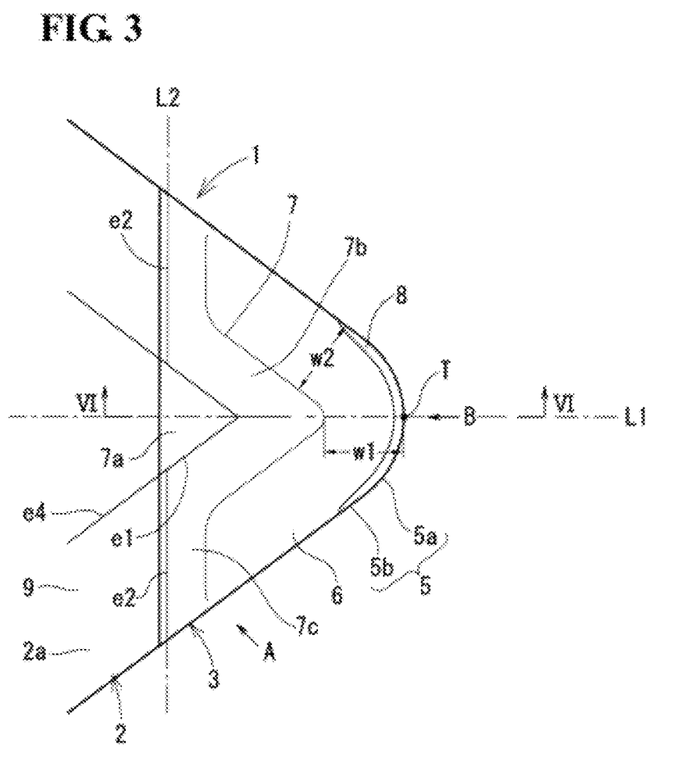
FIG. 3 is an enlarged plan view of the main part of the cutting insert illustrated in FIG. 1.
Figure 4:
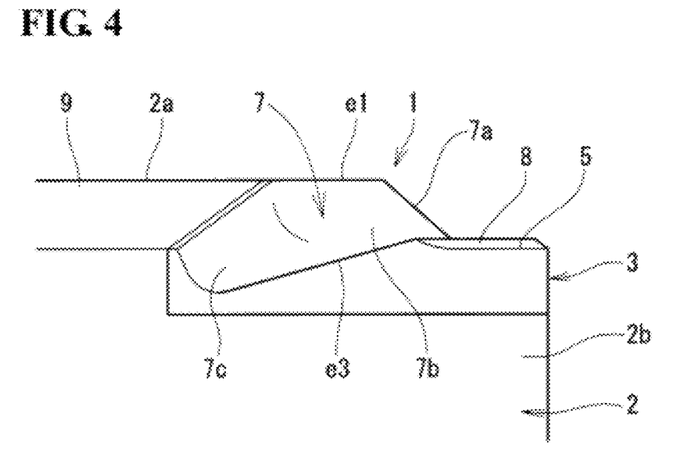
FIG. 4 is an enlarged side view of the main part of the cutting insert illustrated in FIG. 1, viewed in direction A in FIG. 3.
Figure 5:
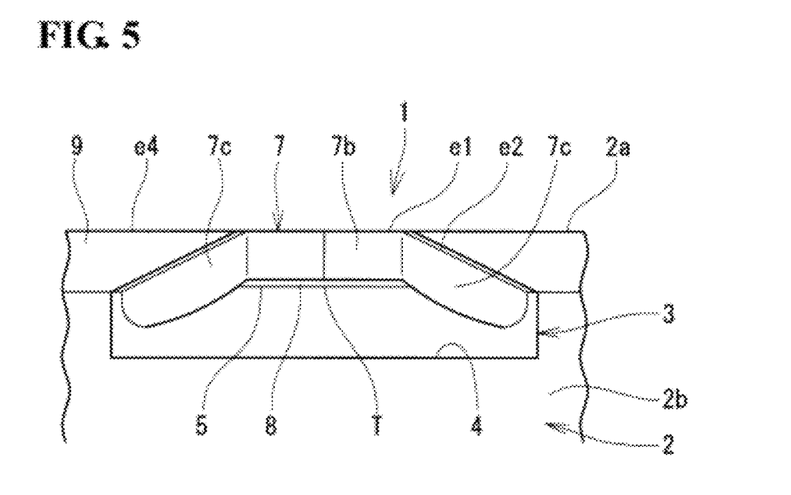
FIG. 5 is an enlarged side view of the main part of the cutting insert illustrated in FIG. 1, viewed in direction B in FIG. 3.

As is clear from FIGS. 2, 4, and 5, the cutting edge 5 formed in each superhard sintered body 3 includes an arc edge 5a that has a substantially constant height. The illustrated cutting edge 5 includes the arc edge 5a shown in FIG. 3, which has the shape of a quarter circle arc in plan view, and short linear edges 5b that continue from both ends of the arc edge. The linear edges 5b may be omitted.

The cutting edge 5 includes a truncated portion 8 for reinforcing the tip of the edge, the truncated portion 8 having an obtuse angle with respect to a side surface of the superhard sintered body 3. The rake face 6 has a positive rake angle θ1 illustrated in FIG. 6. The illustrated truncated portion 8 is a negative rake face formed of a plane. However, the truncated portion 8 may instead be a round surface formed by honing.

Figure 6:
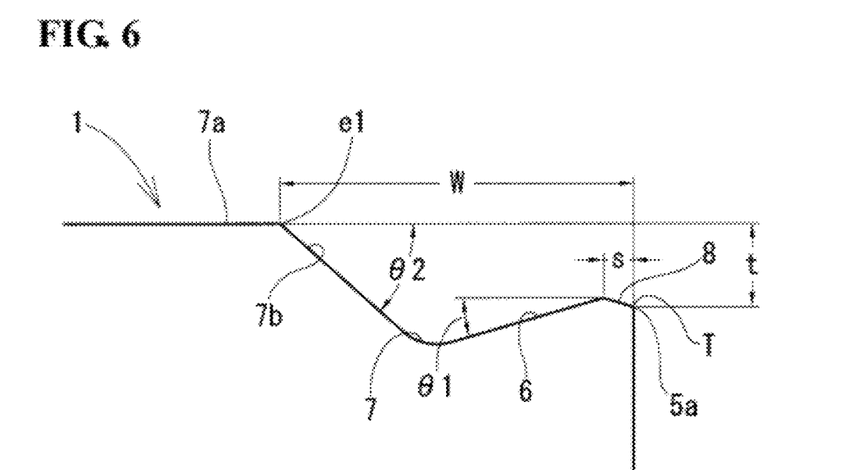
FIG. 6 is an enlarged sectional view of the main part of the cutting insert illustrated in FIG. 1, taken along line VI-VI in FIG. 3.

An appropriate truncation width s of the truncated portion 8 illustrated in FIG. 6 may be about 0.01 to 0.15 mm. This is smaller than a width of cut under general cutting conditions. Accordingly, the strength of the tip of the edge can be increased and sufficient sharpness of the tip can be ensured at the same time. When the truncation width s is smaller than the width of cut, chips flow along the rake face. Therefore, the process of breaking the chips can be reliably performed.

In a plan view of the insert (FIG. 3), the chip breaker 7 includes a projection 7a that projects from a line L2 that crosses a bisector L1 of the corner toward a tip end T of the arc edge 5a of the cutting edge; first breaker walls 7b, each of which is formed between a top edge e1 of the projection 7a and the rake face 6; and second breaker walls 7c, each of which is formed between a ridge line e2 that extends from the base end of the projection 7a to a side surface of the superhard sintered body 3 and the rake face 6. As illustrated in FIG. 3, the tip end T of the arc edge 5a is positioned on the bisector L1 of the corner.

Ridge lines e3, each of which is formed between the rake face 6 and the side surface of the superhard sintered body 3, are inclined such that the distance to a bottom surface 2c of the substrate decreases as the distance from the cutting edge 5 increases. The ridge lines e3 are not cutting edges. Therefore, the rake face 6 may cross the side surface of the superhard sintered body 3 at an acute angle in areas where the ridge lines e3 are formed.

Since portions around the ridge lines e3 do not directly perform the cutting process, the rake angle θ1 of the rake face 6 may be set so as to gradually decrease as the distance from the tip end T of the arc edge 5a increases.

A standing angle θ2 of the first breaker walls 7b on the bisector L1 of the corner illustrated in FIG. 6 is preferably greater than the rake angle θ1 of the rake face 6. This also applies to a standing angle of the second breaker walls 7c. When the insert is used under general conditions, the rake angle θ1 is preferably greater than 0° and smaller than or equal to 30°. The standing angle θ2 of the first and second breaker walls 7b and 7c is preferably greater than or equal to 30° and smaller than or equal to 80°. The first and second breaker walls 7b and 7c may be formed of curved surfaces. When the insert has the above-described preferred structures, the first and second breaker walls 7b and 7c function effectively and the process of breaking the chips can be reliably performed.

When W is a distance from the tip end T of the arc edge 5a to a projecting end of the projection 7a (breaker width) illustrated in FIG. 6 and t is a depth from a core, which is a depth of the cutting edge 5 from the top surface of the superhard sintered body 3 illustrated in FIG. 6, the following conditions are preferably satisfied: 0.1 mm≤W≤1.8 mm and 0 mm≤t≤0.5 mm.

When t is larger than 0, the tip of the edge is positioned lower than the core. When the edge of the cutting insert is positioned lower than the core, a so-called second contact occurs in internal turning, which causes an increase in the turning resistance. In the cutting insert according to the present invention, the cutting edge has a positive rake angle. Therefore, the depth from the core can be set to 0, or the tip of the edge can be positioned higher than the core, that is, above the top surface of the substrate. Accordingly, the second contact can be avoided in internal turning and versatility in the selection of the processing conditions can be increased.

A width w1 of the rake face 6 at the center of the arc edge and a width w2 of the rake face 6 at a position along the side surface of the superhard sintered body 3 (the rake face having the width w2 is not necessary in the areas that do not correspond to the cutting edge) are both appropriately in the range of about 0.1 to 0.5 mm. The rake face 6 may be designed such that the width thereof increases as the distance from the nose center increases so that w2>w1 is satisfied. With such a design, the contact pressure of the chips with respect to the first breaker walls 7b is reduced, so that the chip flow-out resistance can be further reduced. It is not necessary to form the rake face 6 in areas that are far from the nose center and in which the cutting edge is not formed.

In the illustrated cutting insert, negative rake faces (truncated portions) 9 having a predetermined height are formed at crossing sections between a top surface 2a and a side surface 2b of the substrate 2. The top edges e1 of the projection 7a are located on the extensions of ridge lines e4 between the negative rake faces 9 and the top surface 2a. The projection 7a projects in a triangular shape in plan view. It is not essential in the present invention that the top edges e1 of the projection 7a be located on the extensions of the ridge lines e4. However, when the top edges e1 are thus arranged, the negative rake faces 9 can be easily processed.

The negative rake faces 9 may be formed after the superhard sintered body 3 is bonded to the substrate 2. Then, the rake face 6, the projection 7a, and the first and second breaker walls 7b and 7c may be formed by cutting appropriate portions of the superhard sintered body 3.

The process of forming blank portions in the superhard sintered body 3 (process of cutting appropriate portions) may be performed by, for example, laser-beam machining.

Example 1

Figure 7:
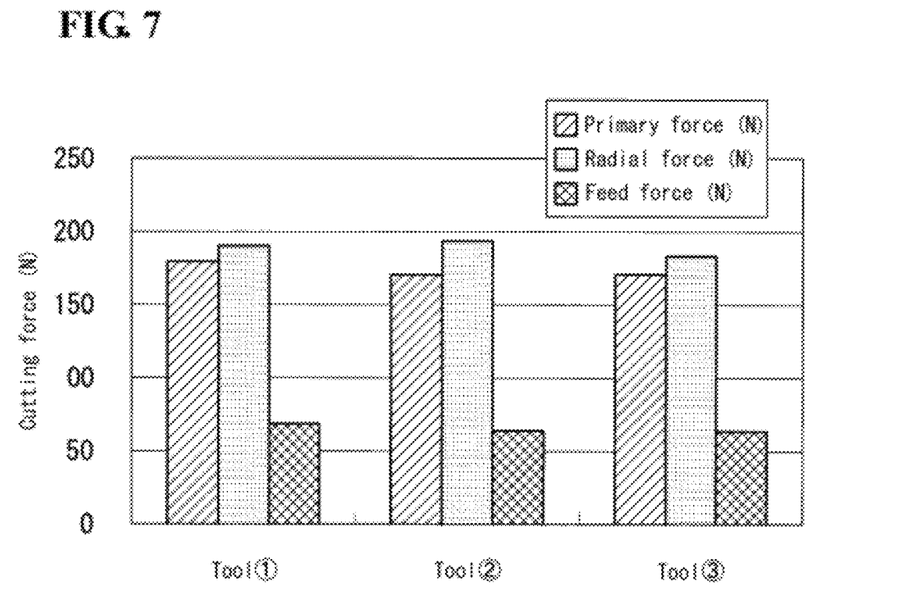
FIG. 7 is a graph illustrating cutting forces applied to cutting inserts according to the present invention and comparative examples in Example 1.

Cutting tests were performed using a cutting tool in which the cutting edge of a cutting insert has a rake angle θ1 of 0° and in which the above-described ridge lines e3 are not formed (comparative example 1, tool 1), a cutting tool in which the rake angle θ1 is 15° and the above-described ridge lines e3 are not formed (comparative example 2, tool 2), and a cutting tool in which the rake angle θ1 is 15° and the ridge lines e3 are formed (the present invention, tool 3), and the cutting forces (primary force, radial force, and feed force) applied to the tools were determined. FIG. 7 shows the test results.

In addition, the chip breaking performance of each tool was evaluated. FIG. 8(a) illustrates the chips generated by the tool of comparative example 1, FIG. 8(b) illustrates the chips generated by the tool of comparative example 2, and FIG. 8(c) illustrates the chips generated by the tool of the present invention. The chip breaking performance of each tool was evaluated by observing the shapes of the chips.

The tests for evaluation were performed under the following conditions:
Tool Model No.: CNGA120408, BNC200
Holder Model No.: DCLNR2525M12
Workpiece: SCM415, HRC60, ϕ100 mm
Machining Conditions
vc (cutting speed): 100 m/min
f (feed): 0.2 mm/rev
ap (cutting depth in axial direction): 0.2 mm
Cutting Mode Dry Cutting
Cutting Method External Turning As is clear from the test results (FIG. 7), according to the present invention, the radial force applied in the cutting process was about 5% smaller than those applied in the cutting processes using the tools of comparative examples 1 and 2.

Figure 8:
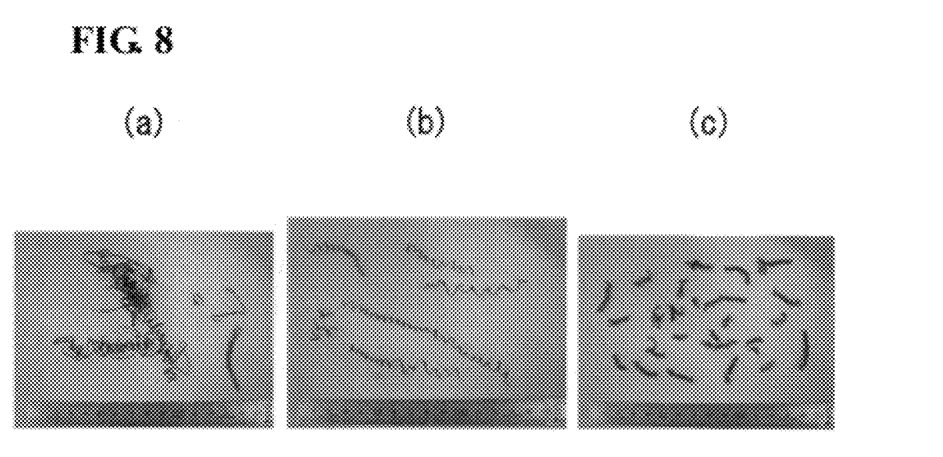

In addition, as is clear from FIG. 8, the chips generated by the tool of the present invention are broken into smaller pieces than those generated by the tools of comparative examples. Thus, the tool of the present invention has a higher chip breaking performance.

Example 2

Cutting tests were performed by using the same tools as those used in Example 1 but under cutting conditions different from those in Example 1. The cutting forces (primary force, radial force, and feed force) applied to the tools were determined, and the chip breaking performance of each tool was evaluated. The results are illustrated in FIGS. 9 and 10.

With regard to the cutting conditions, only the feed was changed from that in Example 1 and was set to f=0.3 mm/rev. The other conditions were the same as those in Example 1.

Figure 9:
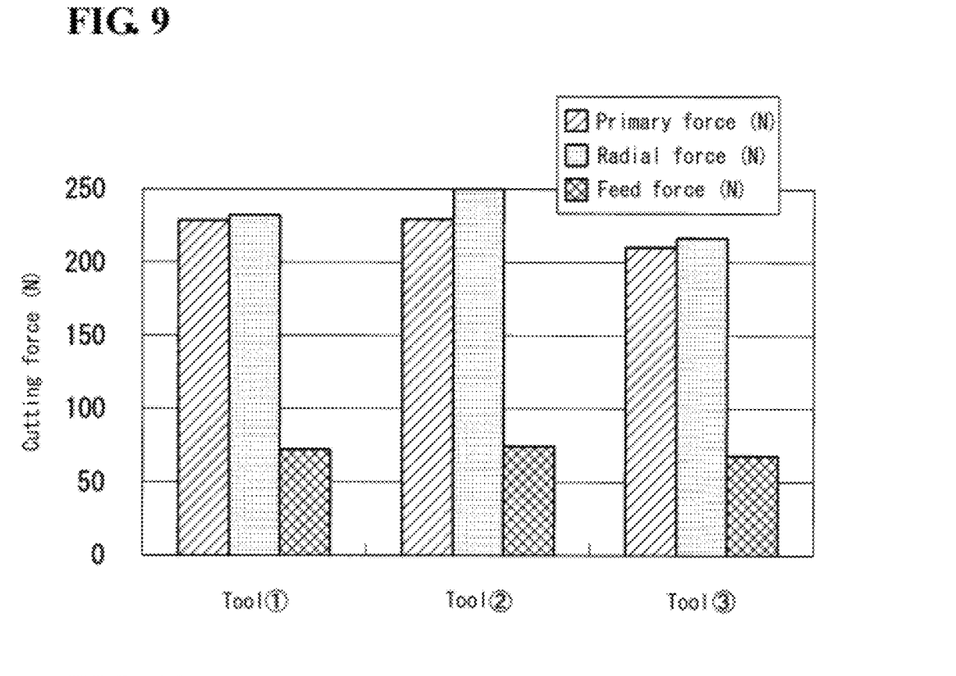
FIG. 9 is a graph illustrating cutting forces applied to cutting inserts according to the present invention and comparative examples in Example 2.

As is clear from FIG. 9, in these tests, the radial force applied in the cutting process using the tool of the present invention was about 15% smaller than those applied in the cutting processes using the tools of comparative examples 1 and 2.

Figure 10:
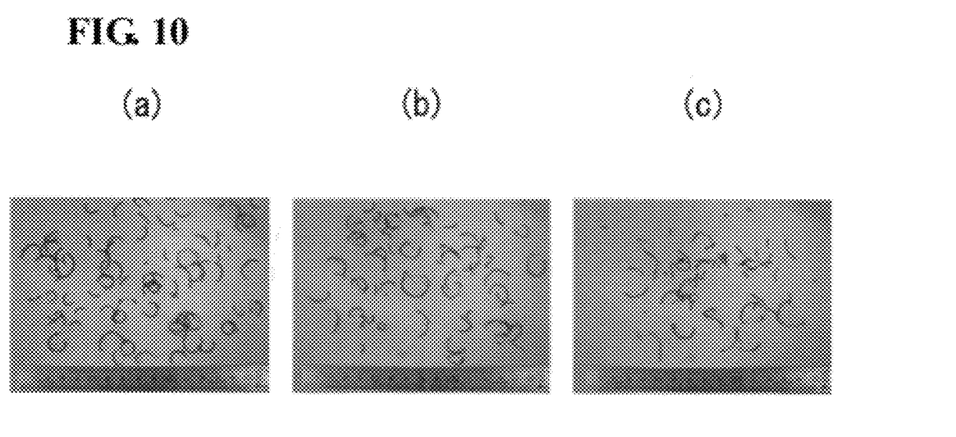

In addition, as is clear from FIG. 10, the chips generated by the tool of the present invention are broken into smaller pieces than those generated by the tools of comparative examples.

Figure 11:
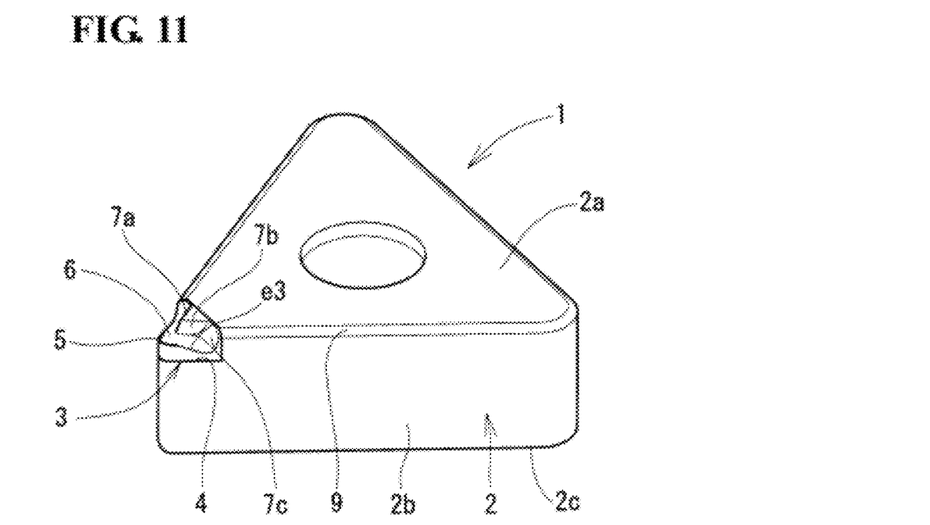
FIG. 11 is a perspective view illustrating another example of a cutting insert according to the present invention.

FIG. 11 is a triangular cutting insert to which the present invention is applied. As in this example, the present invention can also be applied to a triangular cutting insert. With the triangular cutting insert, three corners of the cutting insert can be used by bonding the superhard sintered body to each corner of the cutting insert.

FIGS. 12 to 16 illustrate other examples of cutting inserts according to the present invention. These cutting inserts differ from the cutting insert illustrated in FIG. 1 in the following points. That is, in the cutting insert 1 illustrated in FIG. 12, the top edges e1 of the projection 7a are positioned lower (closer to the bottom surface 2c of the substrate) than the top surface 2a of the substrate.

Figure 13:
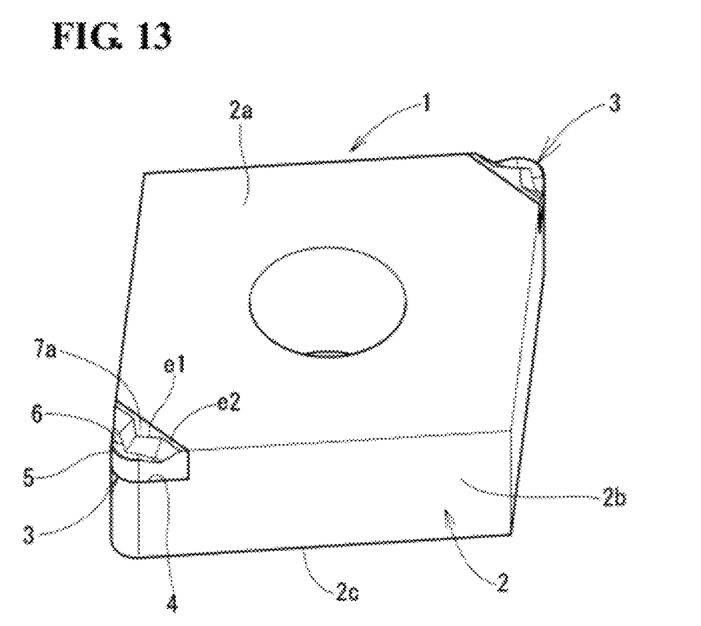
FIG. 13 is an enlarged perspective view of the main part of another example of a cutting insert according to the present invention.
Figure 14:
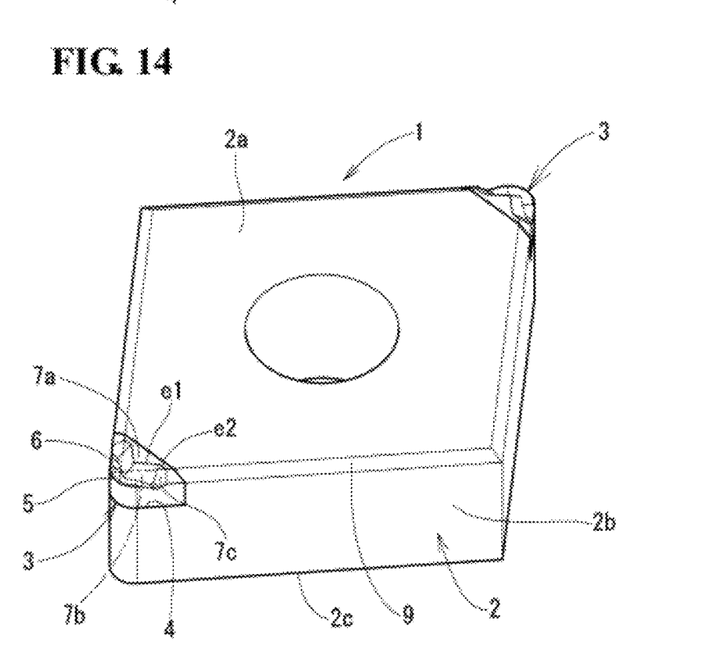
FIG. 14 is an enlarged perspective view of the main part of another example of a cutting insert according to the present invention.

In the cutting insert 1 illustrated in FIG. 13, the above-described negative rake faces 9 are not formed. In the cutting insert 1 illustrated in FIG. 14, the top edges e1 of the projection 7a are formed at positions further toward the inside (toward the central area of the substrate 2) than the extensions (shown by dashed lines) of the ridge lines between the top surface 2a of the substrate and the negative rake faces 9.

Figure 15:
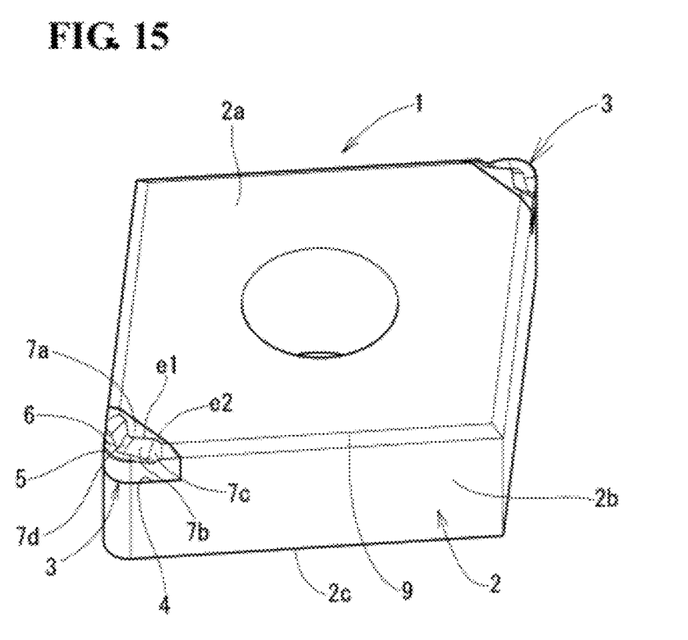
FIG. 15 is an enlarged perspective view of the main part of another example of a cutting insert according to the present invention.
Figure 16:
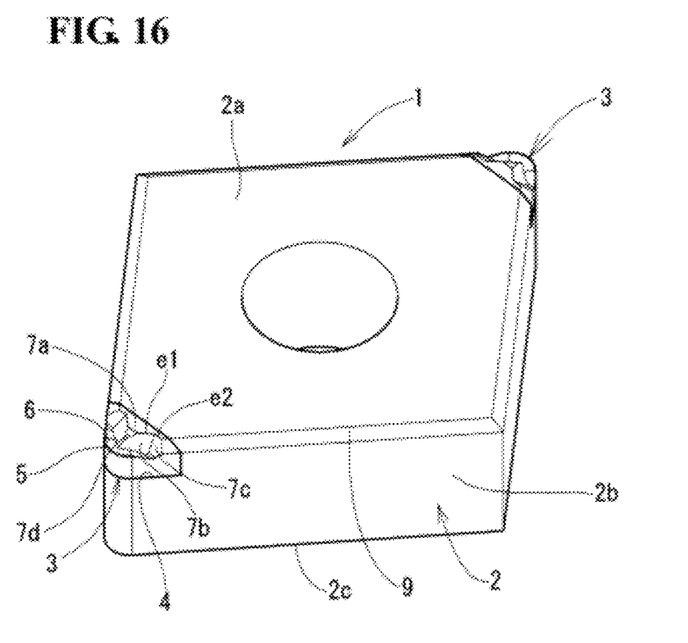
FIG. 16 is an enlarged perspective view of the main part of another example of a cutting insert according to the present invention.

In the cutting insert 1 illustrated in FIG. 15, a tip end portion 7d of the projection 7a is curved so that the tip end portion 7d is reinforced. In the cutting insert 1 illustrated in FIG. 16, a tip end portion 7d of the projection 7a is truncated so that the tip end portion 7d is reinforced.

Figure 12:
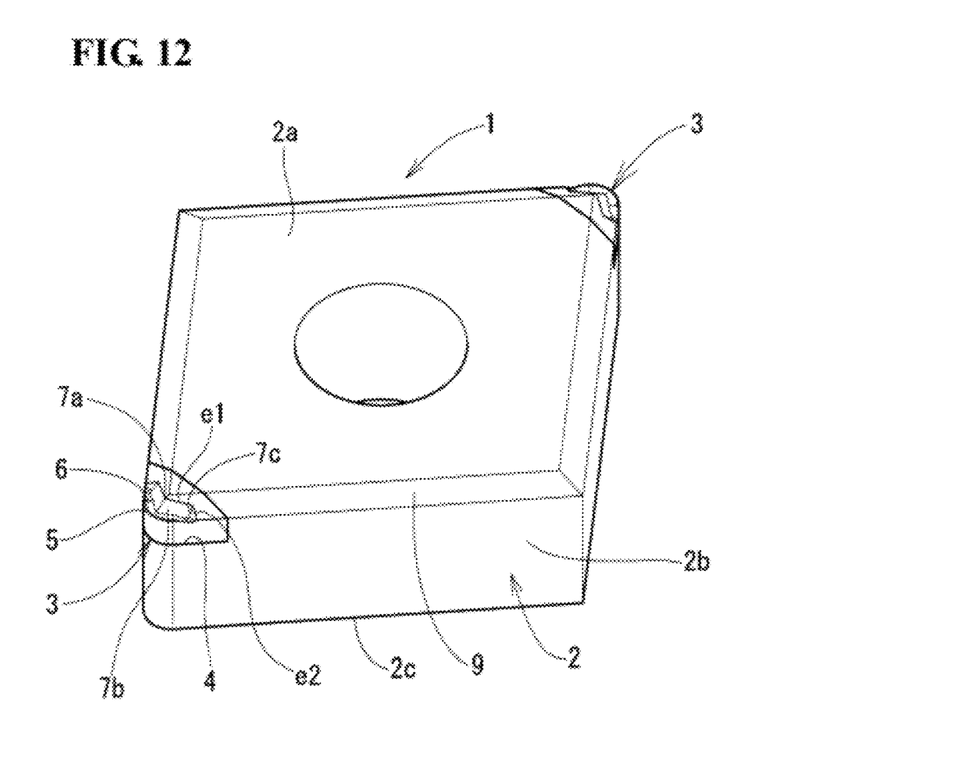
FIG. 12 is an enlarged perspective view of the main part of another example of a cutting insert according to the present invention.

Also in the structures illustrated in FIG. 12 and the following drawings, the projection 7a, the first breaker walls 7b, the second breaker walls 7c, and the rake face 6 function effectively so that the chip breaking performance can be increased compared to those of the cutting inserts according to the related art.

FIGS. 12 to 16 simply illustrate embodiments of the present invention. The present invention is not limited to the above-described embodiments, and various modifications are possible within the scope of the present invention.

REFERENCE SIGNS LIST 1 cutting insert
2 substrate
2a top surface
2b side surface
3 superhard sintered body
4 seat
5 cutting edge
5a arc edge
5b linear edge
6 rake face
7 chip breaker
7a projection
7b first breaker wall
7c second breaker wall
7d tip end portion of projection
8 truncated portion
9 negative rake face
θ1 rake angle
θ2 standing angle of breaker wall
L1 bisector of corner
L2 straight line perpendicular to L1
e1 top edge of projection
e2 to e4 ridge line
t depth of cutting edge from core
T tip end of arc edge
W distance from vertex of R portion of nose to projecting end of projection
w1 width of rake face at a central area of nose
w2 width of rake face at a position along side surface of superhard sintered body

The invention claimed is:

1. A cutting insert comprising a substrate having a seat recessed from a top surface of the substrate at a corner of the substrate and a superhard sintered body bonded to the seat, a cutting edge, a rake face, and a chip breaker being formed in the superhard sintered body,
wherein the chip breaker includes, in a plan view of the insert, a projection that projects from a line that crosses a bisector of the corner toward a tip end of an arc edge of the cutting edge; a first breaker wall formed between a top edge of the projection and the rake face; and a second breaker wall formed between a first ridge line that extends from a base end of the projection to a side surface of the superhard sintered body and the rake face,
wherein the rake face has a positive rake angle,
wherein a second ridge line formed between the rake face and the side surface of the superhard sintered body is inclined such that a distance to a bottom surface of the substrate decreases as a distance from the cutting edge increases, and
wherein the second ridge line does not extend along the cutting edge.

2. The cutting insert according to claim 1, wherein a standing angle of the first and second breaker walls is greater than or equivalent to a rake angle of the rake face.

3. The cutting insert according to claim 1, wherein a distance (W) from the tip end of the arc edge to a projecting end of the projection and a depth (t) of the cutting edge from a top surface of the superhard sintered body satisfy the following conditions:

$$0.1 \text{ mm} \leq W \leq 1.8 \text{ mm; and } 0 \text{ mm} \leq t \leq 0.5 \text{ mm}.$$

4. The cutting insert according to claim 1, wherein the rake angle of the rake face is greater than 0° and is smaller than or equal to 30°.

5. The cutting insert according to claim 1, wherein a negative rake face having a predetermined height is formed at a crossing section between a top surface and a side surface of the substrate, the top edge of the projection being located on an extension of a third ridge line between the negative rake face and the top surface the second breaker wall crossing the negative rake face.

6. The cutting insert according to claim 1, wherein the superhard sintered body is a sintered body in which the content of cubic boron nitride is 20 volume percent or more.

7. The cutting insert according to claim 1, wherein the cutting edge includes a truncated portion, and the truncated portion has an obtuse angle with respect to a side surface of the superhard sintered body.

8. The cutting insert according to claim 1, wherein the second ridge line extends from a first terminal end of the cutting edge to the first ridge line.

9. The cutting insert according to claim 1, wherein the second ridge line is formed directly between the rake face and the side surface of the superhard sintered body.

10. The cutting insert according to claim 1, wherein the second ridge line is not a cutting edge.

* * * * *